UNITED STATES PATENT OFFICE.

WILLIAM M. BREWER, OF NEW BRIGHTON, ASSIGNOR OF ONE-HALF TO FRANK P. MUSSER, OF BEAVER FALLS, PENNSYLVANIA.

METHOD OF TREATING CLAY FOR POTTERY-WARE.

SPECIFICATION forming part of Letters Patent No. 491,074, dated February 7, 1893.

Application filed April 15, 1892. Serial No. 429,342. (No specimens.)

*To all whom it may concern:*

Be it known that I, WILLIAM M. BREWER, a citizen of the United States, and a resident of New Brighton, in the county of Beaver and State of Pennsylvania, have invented certain new and useful Improvements in Methods of Treating Clay for Making Pottery-Ware; and I do hereby declare that the following is a full, clear, and exact description of the invention, which will enable others skilled in the art to which it appertains to make and use the same.

My invention relates to improvements in methods of treating clay for making pottery-ware, tile, brick and other analogous articles.

The object of the invention is to provide an improved method of preparing or treating clay that articles made therefrom will not contract or warp, crease or break while being burned in the kiln. As is well known in burning or firing pottery-ware, brick, tile and similar articles it frequently happens that the same are greatly damaged or entirely ruined owing to the contraction and warping of the clay, causing such articles to be misshaped, cracked or broken.

My invention is designed to obviate the above and other objections and it consists in the novel method hereinafter fully described and claimed.

In carrying my invention into effect, I take any ordinary or suitable pottery or brick clay, and burn the same in a kiln forming what is known in the art as a biscuit. This burnt clay or biscuit is then pulverized or reduced to fine powder and mixed with about one-third its bulk of raw or unburnt clay, and to about every one hundred pounds of the mixture I add the following ingredients, in about the following proportions, viz: Five quarts of sand such as is used in making glass. Three pints ground flint. Eight quarts slaked lime. Two quarts common salt. The mass is thoroughly mixed and then placed in a dark damp place and covered with wet cloths to keep it moist, and after an interval varying from two to six weeks, according to the quantity and circumstances the mixture is tempered to the required consistency for use.

Articles or objects made from clay treated in the above manner, can be burned or fired in a kiln without any liability of warping or breaking.

Having thus described my invention, what I claim is:

The method herein described of treating clay which consists in first burning the same, thus reducing the burnt clay or biscuit to powder, and mixing therewith about one-third its bulk of raw or unburnt clay, then adding glass, sand, flint, slaked lime and common salt in about the proportions specified, then storing away and finally tempering to the proper consistency for use, substantially as set forth.

In testimony that I claim the foregoing as my own I have hereunto affixed my signature in presence of two witnesses.

WILLIAM M. BREWER.

Witnesses:
JOHN H. STURGEON,
Z. B. SWEAMGEN.